US009983061B2

(12) United States Patent
Zhang

(10) Patent No.: US 9,983,061 B2
(45) Date of Patent: May 29, 2018

(54) METHOD, APPARATUS AND SYSTEM FOR TESTING OPTICAL CHARACTERISTICS OF DISPLAY MODULE

(71) Applicants: BOE TECHNOLOGY GROUP CO., LTD., Beijing (CN); HEFEI BOE OPTOELECTRONICS TECHNOLOGY CO., LTD., Hefei, Anhui (CN)

(72) Inventor: Xiongjian Zhang, Beijing (CN)

(73) Assignees: BOE TECHNOLOGY GROUP CO., LTD., Beijing (CN); HEFEI BOE OPTOELECTRONICS TECHNOLOGY CO., LTD., Hefei, Anhui (CN)

(*) Notice: Subject to any disclaimer, the term of this patent is extended or adjusted under 35 U.S.C. 154(b) by 150 days.

(21) Appl. No.: 14/802,045

(22) Filed: Jul. 17, 2015

(65) Prior Publication Data
US 2016/0282186 A1 Sep. 29, 2016

(30) Foreign Application Priority Data

Mar. 25, 2015 (CN) .......................... 2015 1 0133241

(51) Int. Cl.
G01J 3/50 (2006.01)
G09G 3/00 (2006.01)
G09G 5/02 (2006.01)
(52) U.S. Cl.
CPC .............. *G01J 3/506* (2013.01); *G09G 3/006* (2013.01); *G09G 5/02* (2013.01)

(58) Field of Classification Search
None
See application file for complete search history.

(56) References Cited

U.S. PATENT DOCUMENTS

2006/0280360 A1* 12/2006 Holub ....................... G01J 3/02
382/162
2012/0250022 A1* 10/2012 Zhou ..................... G01J 3/0205
356/425

(Continued)

FOREIGN PATENT DOCUMENTS

CN 101191756 A 6/2008
CN 101345033 A 1/2009

(Continued)

OTHER PUBLICATIONS

First Chinese Office Action dated Nov. 2, 2016; Appln. No. 201510133241.8.

(Continued)

*Primary Examiner* — Shawn Decenzo
(74) *Attorney, Agent, or Firm* — Ladas & Parry LLP

(57) ABSTRACT

A method, an apparatus and a system for testing optical characteristics of a display module are provided. The apparatus includes an input unit, configured to input a lighting command to a module lighting machine, and input a testing command to a color analyzer; a reading unit, configured to read the parameter values from the color analyzer after the input unit inputs the testing command to the color analyzer; a determining unit, configured to determine whether the optical characteristics of the display module conform to a preset standard according to the parameter values, which are detected by the color analyzer, read by the reading unit after testing for a preset number of times.

20 Claims, 6 Drawing Sheets

(56) References Cited

U.S. PATENT DOCUMENTS

| | | | |
|---|---|---|---|
| 2013/0207949 A1 | 8/2013 | Jiang et al. | |
| 2013/0242290 A1* | 9/2013 | Yin | G01J 1/0271 356/218 |
| 2013/0293567 A1* | 11/2013 | Shigeta | G01J 3/506 345/589 |
| 2014/0192351 A1* | 7/2014 | Lin | G01J 1/04 356/218 |
| 2014/0192357 A1* | 7/2014 | Sano | G01J 3/26 356/402 |

FOREIGN PATENT DOCUMENTS

| | | |
|---|---|---|
| CN | 101587703 A | 11/2009 |
| CN | 103018934 A | 4/2013 |
| CN | 203070735 U | 7/2013 |
| CN | 103268745 A | 8/2013 |

OTHER PUBLICATIONS

The Second Chinese Office Action dated Jul. 3, 2017; Appln. No. 201510133241.8.

* cited by examiner

METHOD, APPARATUS AND SYSTEM FOR TESTING OPTICAL CHARACTERISTICS OF DISPLAY MODULE

TECHNICAL FIELD

Embodiments of the invention relate to a method, an apparatus and a system for testing optical characteristics of a display module.

BACKGROUND

With constant development of a display technology, a display module becomes widely available, especially, its demand on small-sized electronic devices such as a cellphone becomes increasingly pronounced. Consequently, requirements for optical characteristics of the display module, such as a gamma characteristic and a flicker characteristic, become higher and higher.

In the prior art, when a manufacturer of the display module produces the display module, the optical characteristics of the display module are tested generally in a manual testing manner. Particularly, with the gamma characteristic as an example, a testing person firstly energizes a to-be-tested display module, and enables the to-be-tested display module to display a testing frame; the testing person reads brightness values when the to-be-tested display module tested by a testing instrument displays the testing frame, and manually inputs the brightness values into a preset excel form in a computer; the computer draws a gamma curve according to data in the excel form, so that the testing person may judge whether the gamma characteristic of the display module conforms to a preset standard or not according to a relationship between the gamma curve and a standard gamma curve.

However, in the above method of manually testing the optical characteristics of the display module, because the brightness values when the to-be-tested display module displays the testing frame are manually read or input into the excel form, it may cause a result that testing results of the optical characteristics of the display module are not accurate enough and the testing efficiency is relatively low.

SUMMARY OF THE INVENTION

At least one embodiment of the present invention provides an apparatus for testing optical characteristics of a display module, comprising:

an input unit, configured to input a lighting command to a module lighting machine, and input a testing command to a color analyzer, the lighting command being used for instructing the module lighting machine to input a preset testing frame to a to-be-tested display module, the testing command being used for instructing the color analyzer to detect parameter values when the to-be-tested display module displays the preset testing frame;

a reading unit, configured to read the parameter values from the color analyzer after the input unit inputs the testing command to the color analyzer; and a determining unit, configured to determine whether the optical characteristics of the display module conform to a preset standard according to the parameter values, which are detected by the color analyzer, read by the reading unit after testing for a preset number of times.

At least one embodiment of the invention provides a system for testing optical characteristics of a display module, comprising a computer, as well as a module lighting machine and a color analyzer which are connected with the computer, wherein, the computer is configured to input a lighting command to the module lighting machine and input a testing command to the color analyzer, the lighting command being used for instructing the module lighting machine to input a preset testing frame to a to-be-tested display module, the testing command being used for instructing the color analyzer to detect parameter values when the to-be-tested display module displays the preset testing frame;

the module lighting machine is configured to receive the lighting command input by the computer, and input the preset testing frame to the to-be-tested display module according to the lighting command;

the color analyzer is configured to receive the testing command input by the computer, and detect the parameter values according to the testing command; and the computer is further configured to read the parameter values from the color analyzer, and determine whether the optical characteristics of the to-be-tested display module conform to a preset standard according to the read parameter values detected by the color analyzer after testing for a preset number of times.

At least one embodiment of the invention provides a method for testing optical characteristics of a display module, comprising:

inputting a lighting command to a module lighting machine by a computer, the lighting command being used for instructing the module lighting machine to input a preset testing frame to a to-be-tested display module;

inputting the preset testing frame to the to-be-tested display module by the module lighting machine according to the lighting command;

inputting a testing command to a color analyzer by the computer, the testing command being used for instructing the color analyzer to detect parameter values when the to-be-tested display module displays the preset testing frame;

detecting the parameter values by the color analyzer according to the testing command; and reading the parameter values from the color analyzer by the computer, and determining whether optical characteristics of the to-be-tested display module conform to a preset standard according to the read parameter values detected by the color analyzer after testing for a preset number of times.

At least one embodiment of the invention provides a system for testing optical characteristics of a display module, comprising:

a module lighting machine;
a color analyzer;
a processor;
a memory; and
computer program instructions which are stored in the memory, and the computer program instructions, when executed by the processor, causing the system to:

input a lighting command to the module lighting machine to instruct the module lighting machine to input a preset testing frame to a to-be-tested display module;

input a testing command to the color analyzer to instruct the color analyzer to detect parameter values when the to-be-tested display module displays the preset testing frame; and read the parameter values from the color analyzer, and determine whether optical characteristics of the to-be-tested display module conform to a preset standard according to the read parameter values detected by the color analyzer after testing for a preset number of times.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DESCRIPTION OF THE EMBODIMENTS

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

A method, an apparatus and a system for testing optical characteristics of a display module, provided by embodiments of the present invention, may be applied to a scenario for testing the optical characteristics of the display module. The display module which may be tested by the embodiments of the present invention comprises a liquid crystal display module and an Organic Light Emitting Diode (OLED) display module and the like. The optical characteristics which may be tested by the method, the apparatus and the system for testing the optical characteristics of the display module, provided by the embodiments of the present invention, at least include a gamma characteristic of the display module, a flicker characteristic of the display module, a contrast of the display module and other common optical characteristics which will be mentioned in the following embodiment.

The display module which may be tested by the method, the apparatus and the system for testing the optical characteristics of the display module, provided by embodiments of the present invention, comprises a chip on glass assembly (COGA), that is, an assembly of the chip carried on a glass panel (representing a product form after a polarizer is mounted and a chip is bound); a film on glass (FOG), that is, an assembly of a flexible circuit board carried on a glass panel (representing a product form after a polarizer is mounted as well as a chip and a flexible circuit board are bound); a module (MDL), that is, a module (representing a product form that a polarizer is mounted, a chip and a flexible circuit board are bound as well as a backlight module is mounted), wherein the MDL only exists in the liquid crystal display module.

Figure 1:
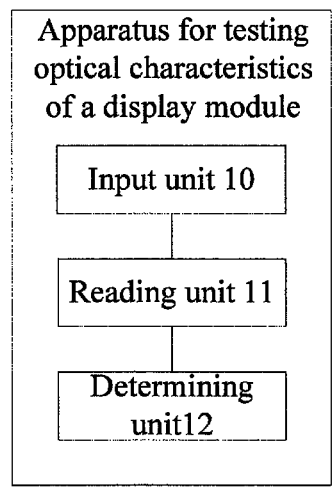
FIG. 1 is a schematic structural diagram I of an apparatus for testing optical characteristics of a display module provided by an embodiment of the present invention.

As illustrated in FIG. 1, an embodiment of the present invention provides an apparatus for testing optical characteristics of a display module, and the apparatus may comprise an input unit 10, a reading unit 11 and a determining unit 12.

The input unit 10 is configured to input a lighting command to a module lighting machine, and input a testing command to a color analyzer, the lighting command being used for instructing the module lighting machine to input a preset testing frame (image) to a to-be-tested display module, and the testing command being used for instructing the color analyzer to detect parameter values when the to-be-tested display module displays the preset testing frame.

The reading unit is configured to read the parameter values from the color analyzer after the input unit inputs the testing command to the color analyzer.

The determining unit 12 is configured to determine whether the optical characteristics of the display module conform to a preset standard according to the parameter values, which are detected by the color analyzer, read by the reading unit after testing for a preset number of times.

The apparatus for testing the optical characteristics of the display module, provided by the embodiment of the present invention, may be a computer, and the apparatus may control the module lighting machine and the color analyzer to automatically complete a testing process of the optical characteristics of the to-be-tested display module through executing specific program codes. The specific program codes executed by the apparatus will be described in detail in the following embodiment, which will not be detailed herein.

Optionally, the module lighting machine provided by the embodiment of the present invention may be a programmable module lighting machine. Particularly, related description of the programmable module lighting machine in the following embodiments may be referred to for details, which will not be detailed herein.

Optionally, the parameter values are brightness values when the to-be-tested display module displays the preset testing frame, and the optical characteristics are at least one of a gamma characteristic of the to-be-tested display module and a contrast of the to-be-tested display module; or the parameter values are flicker values when the to-be-tested display module displays the preset testing frame, and the optical characteristics are flicker characteristics of the to-be-tested display module.

It should be noted that, related descriptions regarding the above brightness value, gamma characteristic, contrast, flicker value and flicker characteristic may refer to related descriptions in illustration of a system for testing optical characteristics of a display module in the following embodiment, which will not be detailed herein.

Optionally, the parameter values are brightness values when the to-be-tested display module displays the preset testing frame, the preset testing frame includes a plurality of gray scale frames, and the brightness values include a plurality of brightness values which are in one-to-one correspondence to the plurality of gray scale frames, The determining unit 12 is configured to convert the plurality of brightness values, which are detected by the color analyzer, read by the reading unit 11 into a plurality of optical characteristic values of the to-be-tested display module, respectively compare the plurality of optical characteristic values of the to-be-tested display module with a preset optical characteristic range, and determine that the optical characteristics of the to-be-tested display module conform to the preset standard if a proportion that the plurality of optical characteristic values of the to-be-tested display module satisfy the preset optical characteristic range is greater than or equal to a preset proportion; and determine that the optical characteristics of the to-be-tested display module do not conform to the preset standard if the proportion that the plurality of optical characteristic values of the to-be-tested display module satisfy the preset optical characteristic range is less than the preset proportion.

It may be appreciated that, when the parameter values are the brightness values when the to-be-tested display module displays the preset testing frame, the computer needs to firstly convert these brightness values into optical characteristic values, for example a gamma value and a contrast value, and then compare these optical characteristic values with the preset optical characteristic range, to determine whether the optical characteristics of the display module conform to the preset standard.

Further, when the computer judges whether the contrast of the display module satisfies a preset standard or not, it may be determined whether the contrast of the display module conforms to the preset standard by calculating the contrast of the display module by only employing a brightness value when the to-be-tested display module displays an all-white frame and a brightness value when the to-be-tested display module displays an all-black frame and comparing the contrast of the display module with a preset standard contrast.

Optionally, the parameter values are flicker values when the to-be-tested display module displays the preset testing frame, and the determining unit 12 is configured to compare the flicker values, which are detected by the color analyzer, read by the reading unit with the preset value, and determine that the optical characteristics of the to-be-tested display module conform to the preset standard if the flicker values are less than the preset value, and determine that the optical characteristics of the to-be-tested display module do not conform to the preset standard if the flicker values are greater than or equal to the preset value.

Figure 2:
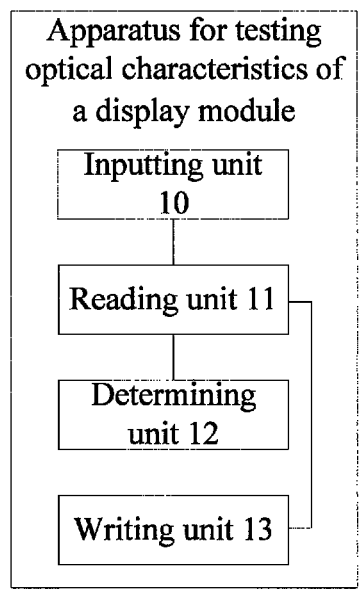
FIG. 2 is a schematic structural diagram II of an apparatus for testing optical characteristics of a display module provided by an embodiment of the present invention.

Optionally, as illustrated in FIG. 2, the apparatus may further comprise a writing unit 13, The writing unit 13 is configured to automatically write the parameter values in preset cells of a testing form after the reading unit 11 reads the parameter values from the color analyzer, the parameter values in the testing form being used for drawing an optical characteristic curve of the to-be-tested display module.

A description regarding the testing form may refer to the related description in the illustration of a system for testing optical characteristics of the display module in the following embodiment, which will not be detailed herein.

Compared with manually inputting parameter values into cells in the prior art, the embodiment of the invention has the advantage that the read parameter values are automatically input into the cells by the computer, so that the write-in accuracy rate and the write-in efficiency of the parameter values may be improved.

Optionally, the apparatus is connected and communicated with the module lighting machine through a serial interface; the apparatus is connected and communicated with the color analyzer through a universal serial bus (USB) interface.

According to the embodiment of the present invention, the computer is connected and communicated with the module lighting machine through an existing universal interface and the computer is connected and communicated with the color analyzer through an existing universal interface, without adding a new interface, such that it is very convenient to implement.

An embodiment of the present invention provides an apparatus for testing optical characteristics of a display module, and the apparatus comprises an input unit, a reading unit and a determining unit. The input unit is configured to input a lighting command to a module lighting machine, and input a testing command to a color analyzer, the lighting command being used for instructing the module lighting machine to input a preset testing frame to a to-be-tested display module, and the testing command being used for instructing the color analyzer to detect parameter values when the to-be-tested display module displays the preset testing frame; the reading unit is configured to read the parameter values from the color analyzer after the input unit inputs the testing command to the color analyzer; the determining unit is configured to determine whether the optical characteristics of the display module conform to a preset standard according to the parameter values, which are detected by the color analyzer, read by the reading unit after testing for a preset number of times.

Based on the above technical solution, the apparatus for testing the optical characteristics of the display module may enable the module lighting machine and the color analyzer to automatically execute corresponding operations according to the commands of the apparatus by inputting the lighting command to the module lighting machine and inputting the testing command to the color analyzer, thereby ensuring that the apparatus can automatically control the whole testing process of the optical characteristics of the to-be-tested display module, further may relatively accurately test the optical characteristics of the display module, and can improve the testing efficiency.

Figure 3:
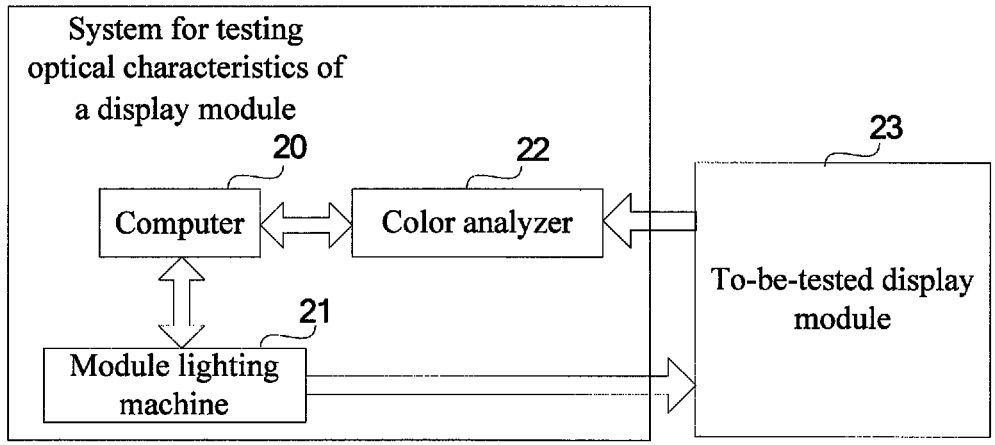
FIG. 3 is a schematic diagram of a system for testing optical characteristics of a display module provided by an embodiment of the present invention.

As illustrated in FIG. 3, an embodiment of the present invention provides a system for testing optical characteristics of a display module, and the system may comprise a computer 20, as well as a module lighting machine 21 and a color analyzer 22 which are connected with the computer 20.

The computer 20 is configured to input a lighting command to the module lighting machine 21 and input a testing command to the color analyzer 22, the lighting command being used for instructing the module lighting machine 21 to input a preset testing frame to a to-be-tested display module 23, and the testing command being used for instructing the color analyzer 22 to detect parameter values when the to-be-tested display module 23 displays the preset testing frame.

The module lighting machine 21 is configured to receive the lighting command input by the computer 20, and input the preset testing frame to the to-be-tested display module 23 according to the lighting command.

The color analyzer 22 is configured to receive the testing command input by the computer 20, and detect the parameter values according to the testing command when the to-be-tested display module 23 displays the preset testing frame.

The computer 20 is further configured to read the parameter values from the color analyzer 22, and determine whether the optical characteristics of the to-be-tested display module conform to a preset standard according to the read parameter values detected by the color analyzer 22 after testing for a preset number of times.

In the system for testing the optical characteristics of the display module, provided by the embodiment of the present invention, the computer 20 may control the module lighting machine 21 and the color analyzer 22 to automatically complete a testing process for the optical characteristics of the to-be-tested display module 23 through executing specific program codes. The specific program codes executed by the computer 20 will be described in detail in the following embodiment, which will not be detailed herein.

Optionally, the module lighting machine provided by the embodiment of the present invention may be a programmable module lighting machine. When the module lighting machine is the programmable module lighting machine, the testing frame input to the to-be-tested display module by the module lighting machine may be changed by changing the testing frame stored in the module lighting machine, so that different optical characteristics of the to-be-tested display module is tested. That is, the programmable module lighting machine may be compatible with multiple optical characteristics of the to-be-tested display module, and the product quality of the to-be-tested display module may be managed and controlled through testing multiple optical characteristics of the to-be-tested display module, so that the product quality of the to-be-tested display module is improved.

Optionally, in the embodiment of the present invention, the above parameter values when the to-be-tested display module displays the preset testing frame may be brightness values when the to-be-tested display module displays the preset testing frame, and correspondingly, the optical characteristics of the to-be-displayed module may be at least one of a gamma characteristic of the to-be-displayed module and a contrast of the to-be-displayed module.

It should be noted that, the above brightness values are physical quantities of illumination intensities of different gray scales when the to-be-tested display module displays the testing frame. The gamma characteristic of the display module is used for characterizing a relationship between a number of gray scales corresponding to the testing frame and the brightness value when the display module displays the testing frame; an amount of distortion of the testing frame (that is, an output image) displayed by the specific display module compared to a display frame (that is, an input image) input to the display module may be configured to represent an amount of distortion of the above gamma characteristic. The contrast of the display module is a ratio of a brightness value when the display module displays a white frame (for example, a testing frame with gray scales of 255) to a brightness value when the display module displays a black frame (for example, a testing frame with gray scales of 0). The gamma characteristic of the display module and the contrast of the display module are key parameters for evaluating the display performance of the display module.

In the display field, one dot which is seen by naked eyes of people on a display screen may be referred to as one pixel, and each pixel comprises a red sub-pixel, a green sub-pixel and a blue sub-pixel. A light source behind each sub-pixel may show a different brightness level. However, the gray scales represent different brightness levels from a darkest level to a brightest level. The more the different brightness levels from the darkest level to the brightest level are, the finer the frame effect which can be illustrated is. With a display module of 8 bits as an example, the eighth power of 2, that is, 256 brightness levels, can be illustrated, and these 256 brightness levels may be referred to as 256 gray scales (generally, 0-255).

Particularly, with the display module of 8 bits as an example, if the brightness values when the display module displays the testing frame may be expressed as L and a number of gray scales corresponding to the testing frame may be expressed as n, the above meaning may be represented by a formula:

$$\text{Gamma characteristic(GAMMA)}=\log(L_n/L_{255})/\log(n/255)$$

$$\text{Contrast(CR)}=L_{255}/L_0$$

Generally, in a process of testing the gamma characteristic of the display module, one gamma value is often required to be tested at each gray scale, and gamma values tested under all gray scales are all compared with a preset gamma range; if a proportion of the gamma values satisfying the gamma range to all gamma values is greater than or equal to a preset proportion, it indicates that the gamma characteristic of the display module conforms to the preset standard; otherwise, it indicates that the gamma characteristic of the display module does not conform to the preset standard.

For instance, if the gamma range is 2.4-2.8 and the preset proportion is 80%, when the proportion of the gamma values satisfying the gamma range in the gamma values tested under all gray scales to all gamma values is greater than or equal to 80%, it indicates that the gamma characteristic of the display module conforms to the preset standard; otherwise, it indicates that the gamma characteristic of the display module does not conform to the preset standard.

Optionally, in the embodiment of the present invention, the parameter values when the to-be-tested display module displays a preset testing frame may also be flicker values when the to-be-tested display module displays the preset testing frame, and correspondingly, the optical characteristics of the to-be-tested display module are flicker characteristics of the to-be-tested display module.

It should be noted that, the above flicker values are flicker levels when the display module displays the testing frame due to a deviation of a positive voltage and a negative voltage which are applied to the display module. For example, under the condition of such a specific voltage, it is assumed that a flicker alternating current brightness variation b is (Lmax−Lmin) and a flicker direct current brightness variation a is (Lmax+Lmin)/2, the flicker levels of the to-be-tested display module are (b/a)*100%, where Lmax and Lmin respectively refer to a maximum brightness and a minimum brightness which are obtained by testing the to-be-tested display module under the condition of such a specific voltage. The flicker characteristics of the display module are key parameters for evaluating the display performance of the display module.

It may be appreciated that, in the embodiment of the present invention, the above illustration of the parameter values when the to-be-tested display module displays the preset testing frame and the optical characteristics of the to-be-tested display module are merely exemplary enumerations, the optical characteristics of the display module, which can be tested by the present invention, include but not limited to those listed above, that is, other optical characteristics of the display module, which can be tested by employing the testing method provided by the present invention, all are intended to be within the protection scope of the present invention.

Optionally, the parameter values when the to-be-tested display module displays the preset testing frame are the brightness values when the to-be-tested display module displays the preset testing frame, the preset testing frame includes a plurality of gray scale frames, and the brightness values include a plurality of brightness values which are in one-to-one correspondence to the plurality of gray scale frames, and the computer 20 is configured to convert the plurality of read brightness values which are detected by the color analyzer into a plurality of optical characteristic values of the to-be-tested display module, respectively compare the plurality of optical characteristic values of the to-be-tested display module with a preset optical characteristic range, and determine that the optical characteristics of the to-be-tested display module conform to the preset standard if a proportion that the plurality of optical characteristic values of the to-be-tested display module satisfy the preset optical characteristic range is greater than or equal to a preset proportion; and determine that the optical characteristics of the to-be-tested display module do not conform to the preset standard if the proportion that the plurality of optical characteristic values of the to-be-tested display module satisfy the preset optical characteristic range is less than the preset proportion.

It may be appreciated that, when the parameter values, when the to-be-tested display module displays the testing frame, tested by the color analyzer are the brightness values, the computer needs to firstly convert these brightness values into optical characteristic values, for example, a gamma value and a contrast value, and then compare these characteristic values with a preset optical characteristic range so as to determine whether the optical characteristics of the display module conform to the preset standard or not.

Further, when the computer judges whether the contrast of the display module satisfies the preset standard or not, it may be determined whether the contrast of the display module satisfies the preset standard or not by calculating the contrast of the display module by only employing the read brightness value, when the to-be-tested display module displays an all-white frame, detected by the color analyzer and the read brightness value, when the to-be-tested display module displays an all-black frame, detected by the color analyzer and comparing the contrast of the display module with a preset standard contrast.

Optionally, when the parameter values upon the to-be-tested display module displaying the preset testing frame are the flicker values upon the to-be-tested display module displaying the preset testing frame, the computer 20 is configured to compare the read flicker values which are detected by the color analyzer with the preset value, and determine that the optical characteristics of the to-be-tested display module conform to the preset standard if the flicker values are less than the preset value, and determine that the optical characteristics of the to-be-tested display module do not conform to the preset standard if the flicker values are greater than or equal to the preset value.

Optionally, the computer 20 is further configured to automatically write the parameter values into preset cells of a testing form after the reading unit reads the parameter values from the color analyzer, the parameter values in the testing form being used for drawing an optical characteristic curve of the to-be-tested display module.

In the embodiment of the present invention, after the computer reads the parameter values when the to-be-tested display module displays the testing frame from the color analyzer, the computer may automatically write the parameter values into the preset cells of the testing form, and the parameter values in the testing form can be used to draw an optical characteristic curve of the to-be-tested display module. The testing form may be a common excel form, and according to features of the excel form, when the computer writes the parameter values upon the to-be-tested display module displaying the testing frame into the cells, the computer may directly draw the optical characteristic curve of the corresponding display module according to these parameter values.

Compared with inputting parameter values into the cells manually in the prior art, the embodiment of the invention has the advantage that the read parameter values are automatically input into the cells by the computer, so that the write-in accuracy rate and the write-in efficiency of the parameter values may be improved.

Optionally, in the embodiment of the present invention, the computer 20 is connected and communicated with the module lighting machine 21 through a serial interface; and the computer 20 is connected and communicated with the color analyzer 22 through a USB interface.

According to the embodiment of the present invention, the computer is connected and communicated with the module lighting machine through an existing universal interface and the computer is connected and communicated with the color analyzer through an existing universal interface, without adding a new interface, such that it is very convenient to implement.

An embodiment of the present invention provides a system for testing optical characteristics of a display module, and the system comprises a computer, as well as a module lighting machine and a color analyzer which are connected with the computer, wherein the computer is configured to input a lighting command to the module lighting machine and input a testing command to the color analyzer; the module lighting machine is configured to receive the lighting command input by the computer, and input a preset testing frame to the to-be-tested display module according to the lighting command; the color analyzer is configured to receive the testing command input by the computer, and detect the parameter values according to the testing command; the computer is further configured to read the parameter values from the color analyzer, and determine whether the optical characteristics of the to-be-tested display module conform to the preset standard according to the read parameter values detected by the color analyzer after testing for a preset number of times.

Based on the above technical solution, the computer inputs the lighting command to the module lighting machine, and inputs the testing command to the color analyzer, and may enable the module lighting machine and the color analyzer to automatically execute corresponding operations according to the commands of the computer, thereby ensuring that the computer can automatically control the whole testing process of the optical characteristics of the to-be-tested display module, further can relatively accurately test the optical characteristics of the display module, and can improve the testing efficiency.

Figure 4:
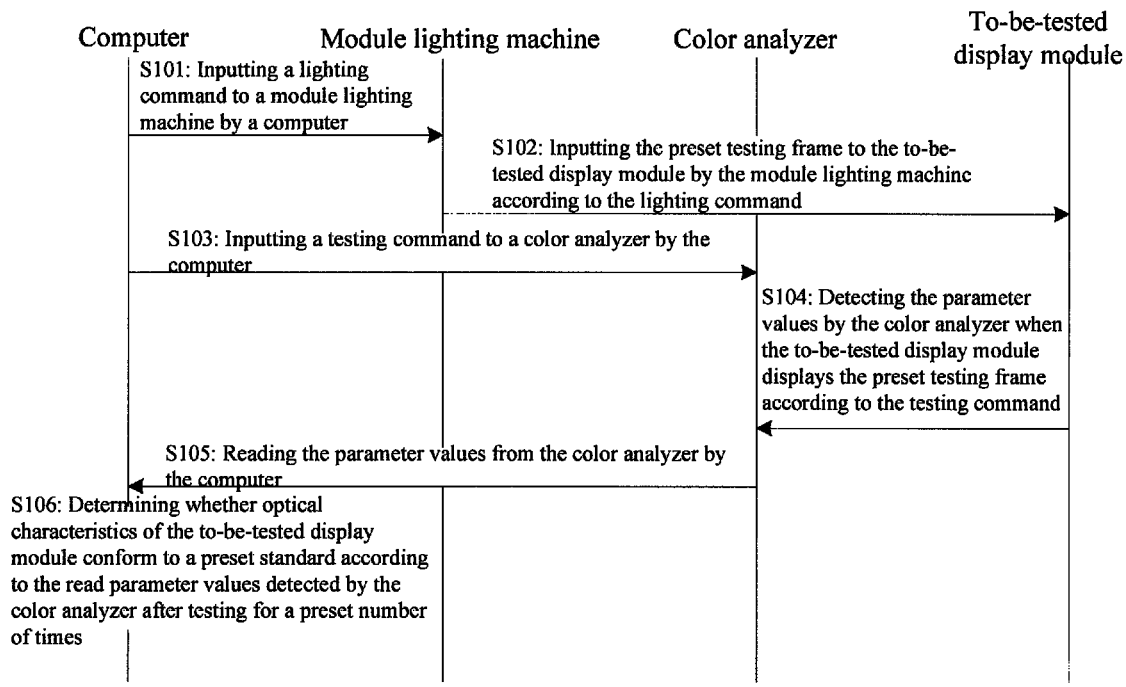
FIG. 4 is a schematic diagram I of a method for testing optical characteristics of a display module provided by an embodiment of the present invention.

As illustrated in FIG. 4, an embodiment of the present invention provides a method for testing optical characteristics of a display module, and the method may comprise:

S101: Inputting a lighting command to a module lighting machine by a computer, the lighting command being used for instructing the module lighting machine to input a preset testing frame to a to-be-tested display module.

The preset testing frame may be preset in the module lighting machine, the to-be-tested display module may show different frames through displaying the preset testing frame, and the color analyzer may obtain the parameter values when the to-be-tested display module displays these testing frames through testing these frames. For example, the preset testing frame may be a gray scale frame, the computer controls the module lighting machine to input different gray scale frames to the to-be-tested display module, and the color analyzer may obtain brightness values when the to-be-tested display module displays these gray scale frames through testing these gray scale frames. The gray scale frames are display images corresponding to gray scale values, for example, 255 gray scale values correspond to 255 display images, that is, 255 display images are referred to as 255 gray scale frames.

S102: Inputting the preset testing frame to the to-be-tested display module by the module lighting machine according to the lighting command.

After the module lighting machine receives the lighting command input by the computer, the module lighting machine inputs the preset testing frame to the to-be-tested display module such that the to-be-tested display module displays the preset testing frame.

When different testing frames are required to be continuously displayed by the to-be-tested display module, the computer may continuously input the lighting command to the module lighting machine (for example, it may be a switching command of the gray scale frames), such that the module lighting machine continuously inputs different testing frames to the to-be-tested display module.

S103: Inputting a testing command to a color analyzer by the computer, the testing command being used for instructing the color analyzer to detect parameter values when the to-be-tested display module displays the preset testing frame.

After the computer controls the to-be-tested display module to display the preset testing frame, the computer may control the color analyzer to detect the parameter values when the to-be-tested display module displays the preset testing frame. For example, the computer may input the testing command to the color analyzer to control the color analyzer to start detecting the parameter values when the to-be-tested display module displays the preset testing frame.

S104: Detecting the parameter values by the color analyzer when the to-be-tested display module displays the preset testing frame according to the testing command.

After the color analyzer receives the testing command input by the computer, the color analyzer may start detecting the parameter values when the to-be-tested display module displays the preset testing frame according to the testing command.

S105: Reading the parameter values from the color analyzer by the computer.

S106: Determining whether optical characteristics of the to-be-tested display module conform to a preset standard according to the read parameter values detected by the color analyzer after testing for a preset number of times.

Correspondingly, after the computer inputs the testing command to the color analyzer, the computer may start reading the parameter values tested by the color analyzer from the color analyzer.

In the embodiment of the present invention, when a plurality of parameter values are required to be tested, the computer as well as the module lighting machine and the color analyzer which are controlled by the computer may repeatedly execute steps S101-S105, and after a preset number of tests are completed, the computer may determine whether the optical characteristics of the to-be-tested display module conform to the preset standard according to the parameter values read from the color analyzer; that is, the computer as well as the module lighting machine and the color analyzer which are controlled by the computer may repeatedly execute steps S101-S105, and execute the step S106 after testing a plurality of parameter values is completed. When one parameter value is required to be tested, the computer as well as the module lighting machine and the color analyzer which are controlled by the computer may only execute steps S101-S105 once, and execute the step 106 after testing the parameter values is completed. It may be particularly designed according to an actual demand, which is not specifically defined in the present invention.

The preset number of times may be designed according to an actual testing demand, which is not particularly defined in the present invention. For example, if 17 gray scale frames are required to be tested, the preset number of times may be set to 17, and after the computer as well as the module lighting machine and the color analyzer which are controlled by the computer complete 17 tests, the computer may determine whether the optical characteristics of the to-be-tested display module conform to the preset standard according to the parameter values of the 17 tests.

Optionally, when the above parameter values when the to-be-tested display module displays the testing frame are the brightness values when to-be-tested display module displays the testing frame, the optical characteristics of the to-be-tested display module may be at least one of a gamma characteristic of the to-be-tested display module and a contrast of the to-be-tested display module.

Optionally, when the above parameter values when the to-be-tested display module displays the testing frame are the flicker values when to-be-tested display module displays the testing frame, the optical characteristics of the to-be-tested display module may be flicker characteristics of the to-be-tested display module.

Particularly, descriptions of the parameter values when the to-be-tested display module displays the testing frame and the optical characteristics of the to-be-tested display module may refer to the related description in the embodiment as illustrated in FIG. 3, which will not be detailed herein.

Figure 5:
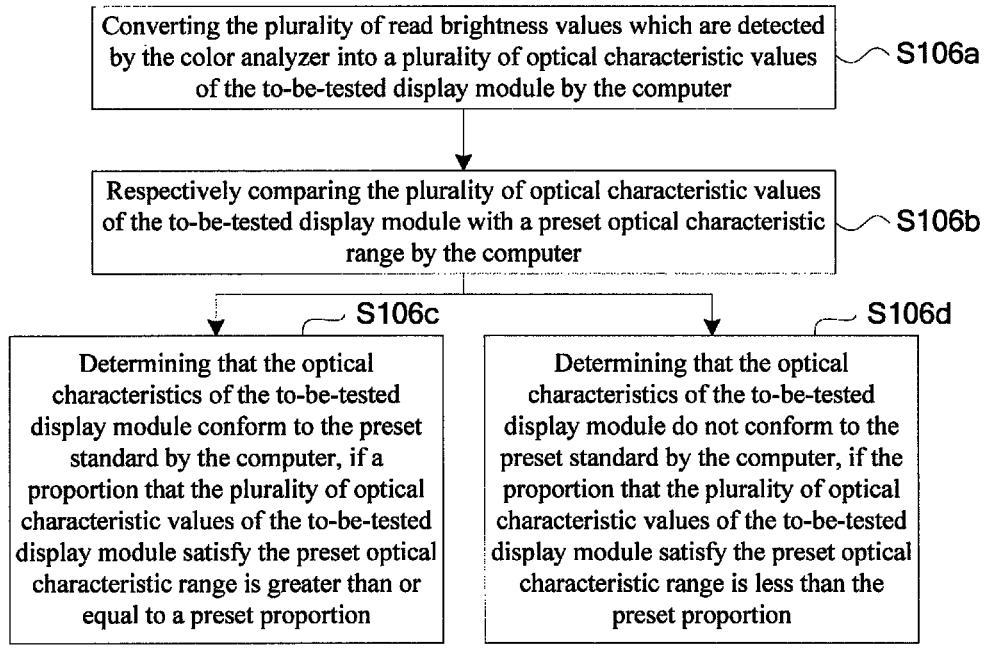
FIG. 5 is a schematic diagram II of a method for testing optical characteristics of a display module provided by an embodiment of the present invention.

Optionally, in conjunction with FIG. 4, as illustrated in FIG. 5, when the above parameter values when the to-be-tested display module displays the preset testing frame are the brightness values when to-be-tested display module displays the preset testing frame and the brightness values include a plurality of brightness values which are in one-to-one correspondence to a plurality of gray scale frames, the above S106, i.e., determining whether the optical characteristics of the to-be-tested display module conform to the preset standard or not according to the read parameter values detected by the color analyzer, includes:

S106a: Converting the plurality of read brightness values which are detected by the color analyzer into a plurality of optical characteristic values of the to-be-tested display module by the computer.

S106b: Respectively comparing the plurality of optical characteristic values of the to-be-tested display module with a preset optical characteristic range by the computer.

S106c: Determining that the optical characteristics of the to-be-tested display module conform to the preset standard by the computer, if a proportion that the plurality of optical characteristic values of the to-be-tested display module satisfy the preset optical characteristic range is greater than or equal to a preset proportion.

S106d: Determining that the optical characteristics of the to-be-tested display module do not conform to the preset standard by the computer, if the proportion that the plurality of optical characteristic values of the to-be-tested display module satisfy the preset optical characteristic range is less than the preset proportion.

In the embodiment of the present invention, if the parameter values, when the to-be-tested display module displays the testing frame, detected by the color analyzer are the brightness values when the to-be-tested display module displays the testing frame, the computer needs to firstly convert the parameter values into optical characteristic values when judging the optical characteristics (for example, the gamma characteristic and the contrast) of the to-be-tested display module.

The above optical characteristic range is generally industry standard values of the to-be-tested display module, and may be particularly determined according to an actual to-be-tested display module, which is not particularly defined in the present invention. A preset proportion may be set according to an actual demand on the display module, for example, and may be set according to different requirements of different consumers, which is not particularly defined in the present invention.

Optionally, the above preset proportion may be further set to a proportion that a plurality of optical characteristic values of the to-be-tested display module do not satisfy the preset optical characteristic range, in this way, the above steps S106c and S106d may respectively be:

S106c: Determining that the optical characteristics of the to-be-tested display module conform to the preset standard by the computer, if the proportion that the plurality of optical characteristic values of the to-be-tested display module do not satisfy the preset optical characteristic range is less than a preset proportion.

S106d: Determining that the optical characteristics of the to-be-tested display module do not conform to the preset standard by the computer, if the proportion that the plurality of optical characteristic values of the to-be-tested display module do not satisfy the preset optical characteristic range is greater than or equal to the preset proportion.

The proportion that the plurality of optical characteristic values of the to-be-tested display module satisfy or do not satisfy the preset optical characteristic range may be understood as: in the plurality of optical characteristic values of the to-be-tested display module, a proportion of the optical characteristic values satisfying or not satisfying the preset optical characteristic range to the plurality of optical characteristic values. For example, it is assumed that the plurality of optical characteristic values of the to-be-tested display module are expressed as n optical characteristic values and a number of optical characteristic values of satisfying or not satisfying the preset optical characteristic range is m, the proportion that the plurality of optical characteristics of the to-be-tested display module satisfy or do not satisfy the preset optical characteristic range is m/n, where m≤n.

Figure 6:
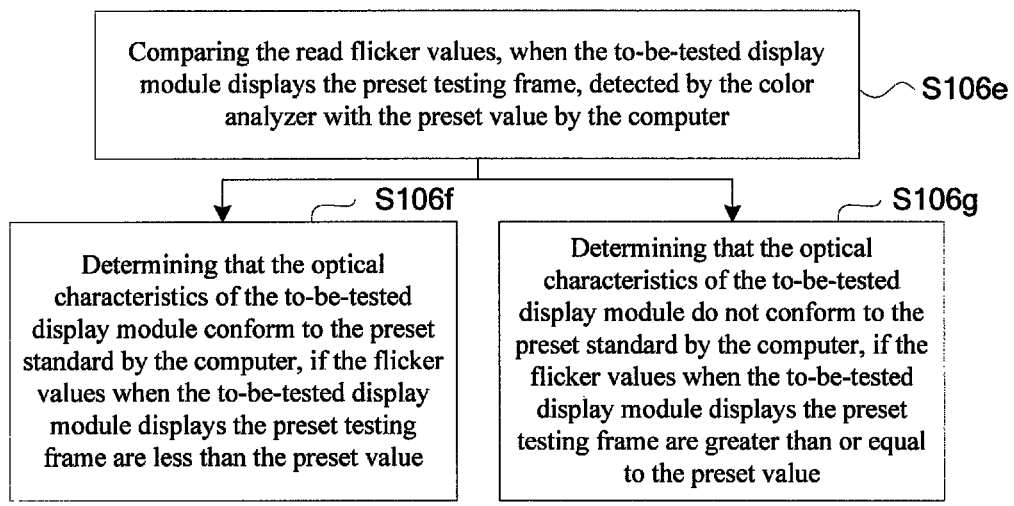
FIG. 6 is a schematic diagram III of a method for testing optical characteristics of a display module provided by an embodiment of the present invention.

Optionally, in conjunction with FIG. 4, as illustrated in FIG. 6, when the parameter values when the to-be-tested display module displays the preset testing frame are the flicker values when the to-be-tested display module displays the preset testing frame, the above S106, i.e., determining, by the computer, whether optical characteristics of the to-be-tested display module conform to a preset standard according to the read parameter value detected by the color analyzer, includes:

S106e: Comparing the read flicker values, when the to-be-tested display module displays the preset testing frame, detected by the color analyzer with the preset value by the computer.

The above parameter values are generally industry standard values of the to-be-tested display module, and may be particularly determined according to an actual to-be-tested display module, which is not particularly defined in the present invention.

S106f: Determining that the optical characteristics of the to-be-tested display module conform to the preset standard by the computer, if the flicker values when the to-be-tested display module displays the preset testing frame are less than the preset value.

S106g: Determining that the optical characteristics of the to-be-tested display module do not conform to the preset standard by the computer, if the flicker values when the to-be-tested display module displays the preset testing frame are greater than or equal to the preset value.

In the embodiment of the present invention, when the flicker characteristics of the to-be-tested display module are required to be judged, because the color analyzer may directly detect the flicker values when the to-be-tested display module displays the preset testing frame, after the computer reads the flicker values detected by the color analyzer, the computer may directly compare the flicker values with a standard flicker value to judge whether the flicker characteristics of the to-be-tested display module conform to the preset standard or not.

It should be noted that, in the embodiment of the present invention, no matter which optical characteristic of the to-be-tested display module is tested, it may be tested by employing a dedicated standard testing frame, which is not defined particularly in the present invention. For example, the gamma characteristic and the contrast may be tested by employing a dedicated standard gray scale frame; and the flicker characteristics may be tested by employing a dedicated standard flicker frame and the like.

Optionally, the above judging step may be set as: if the flicker values when the to-be-tested display module displays the preset testing frame are greater than or equal to the preset value, determining that the optical characteristics of the to-be-tested display module conform to the preset standard; in this way, the above steps S106f and S106g may respectively be:

S106f: Determining that the optical characteristics of the to-be-tested display module conform to the preset standard by the computer, if the flicker values when the to-be-tested display module displays the preset testing frame are greater than or equal to the preset value.

S106g: Determining that the optical characteristics of the to-be-tested display module do not conform to the preset standard by the computer, if the flicker values when the to-be-tested display module displays the preset testing frame are less than the preset value.

Figure 7:
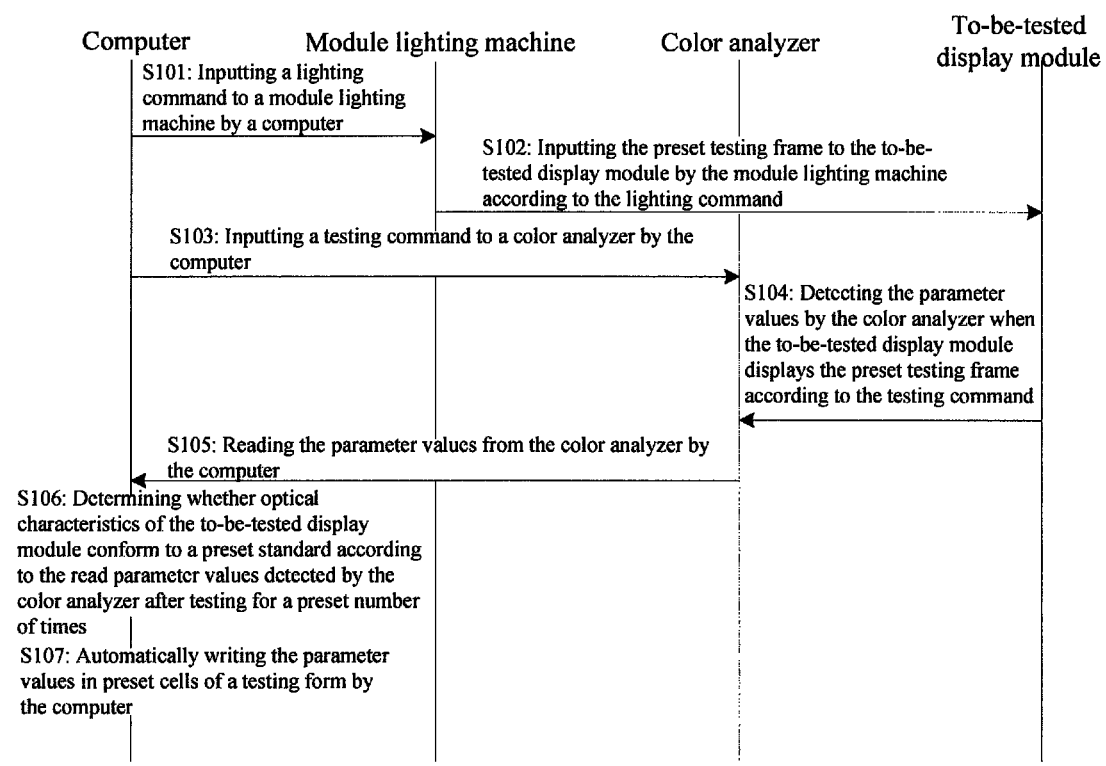
FIG. 7 is a schematic diagram IV of a method for testing optical characteristics of a display module provided by an embodiment of the present invention.

In conjunction with FIG. 4, as illustrated in FIG. 7, an embodiment of the present invention provides a method for testing optical characteristics of a display module, in S105, that is, after the computer reads the parameter values from the color analyzer, the method may further comprise:

S107: Automatically writing the parameter values in preset cells of a testing form by the computer, the parameter values in the testing form being used for drawing an optical characteristic curve of the to-be-tested display module.

After the computer reads the parameter values from the color analyzer, the computer may automatically write the parameter values in the preset cells of the testing form. The parameter values written in the testing form may be used for drawing the optical characteristic curve of the to-be-tested display module.

For example, descriptions of the testing form and the optical characteristic curve of the to-be-tested display module may refer to the above related description in the embodiment as illustrated in FIG. 3, which will not be detailed herein.

The embodiment of the present invention may not define an executing sequence of S106 and S107, that is, the present invention may firstly execute S106 and then execute S107; the present invention may firstly execute S107 and then execute S106; or the present invention may simultaneously execute S106 and S107.

Optionally, in the embodiment of the present invention, the computer is connected and communicated with the module lighting machine through a serial interface; and the computer is connected and communicated with the color analyzer through a USB interface.

According to the embodiment of the present invention, the computer is connected and communicated with the module lighting machine through an existing universal interface, and the computer is connected and communicated with the color analyzer through an existing universal interface, without adding a new interface, such that it is very convenient to implement.

An embodiment of the present invention provides a method for testing optical characteristics of a display module. The method comprises: inputting a lighting command to a module lighting machine by a computer; inputting a preset testing frame to a to-be-tested display module by the module lighting machine according to the lighting command; inputting a testing command to a color analyzer by the computer; detecting parameter values when the to-be-tested display module displays the preset testing frame by the color analyzer according to the testing command; reading the parameter values from the color analyzer by the computer; and determining, by the computer, whether optical characteristics of the to-be-tested display module conform to a preset standard according to the read parameter values detected by the color analyzer after testing for a preset number of times.

Based on the above technical solution, the computer may enable the module lighting machine and the color analyzer to automatically execute corresponding operations according to commands of the computer through inputting the lighting command to the module lighting machine and inputting the testing command to the color analyzer, thereby ensuring that the computer can automatically control the whole testing process of the optical characteristics of the to-be-tested display module, further may relatively accurately test the optical characteristics of the display module, and can improve the testing efficiency.

In a particular implementation process, except for hardware devices such as the above computer, module lighting machine and color analyzer, the method, the apparatus and the system for testing the optical characteristics of the display module, provided by the embodiments of the present invention, also need to be supported by software. Particularly, the computer may complete testing of the optical characteristics of the display module by executing particular program codes in cooperation with the hardware device.

To further know the testing process of the optical characteristics of the display module, provided by the embodiment of the present invention, it will be illustrated in detail below from the perspective of software, that is, the implementation of the program codes executed by the computer.

Figure 8:
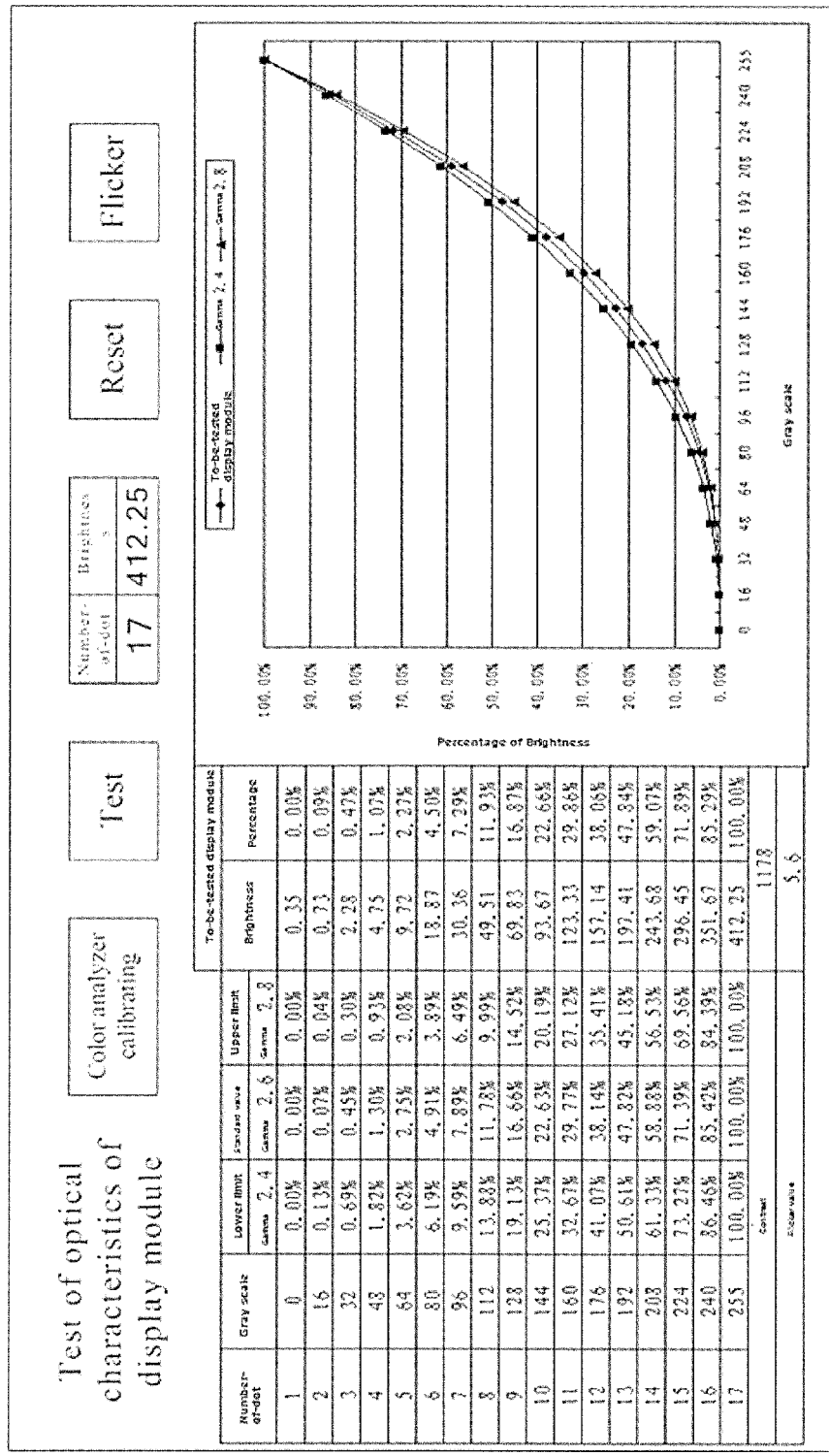
FIG. 8 is a schematic diagram of an interface for testing optical characteristics of a display module provided by an embodiment of the present invention.

With testing the gamma characteristic, the contrast and the flicker characteristics of the display module as an example, as illustrated in FIG. 8, it is a schematic diagram of a testing interface implemented on a computer, provided by an embodiment of the present invention. A "color analyzer calibrating" button is configured to trigger a calibrating process of the color analyzer; a "test" button is configured to trigger a testing process of the gamma characteristic and the contrast; a number-of-dot and brightness display frame is configured to display a number of gray scales corresponding to a testing frame which is being detected by the color analyzer and a brightness value when the to-be-tested display module displays the testing frame, for example, a number of dots 17 represents a testing frame corresponding to the gray scales 255, a brightness 412.25 represents a brightness value 412.25 (a unit of the brightness: lumen) when the to-be-tested display module displays the testing frame of the gray scales 255; a "reset" button is configured to trigger a reset process of testing the program codes, executed by the computer; a "flicker" button is configured to trigger a testing process of the flicker characteristics. Data in the testing form represent results tested by the color analyzer; a curve graph represents a gamma curve graph of the to-be-tested display module, wherein the gamma curve of the to-be-tested display module in FIG. 8 is located between a gamma curve of a standard low limit value and a gamma curve of a standard upper limit value, and may visually represent that the gamma characteristics of the to-be-tested display module conform to the preset standard.

Figure 9:
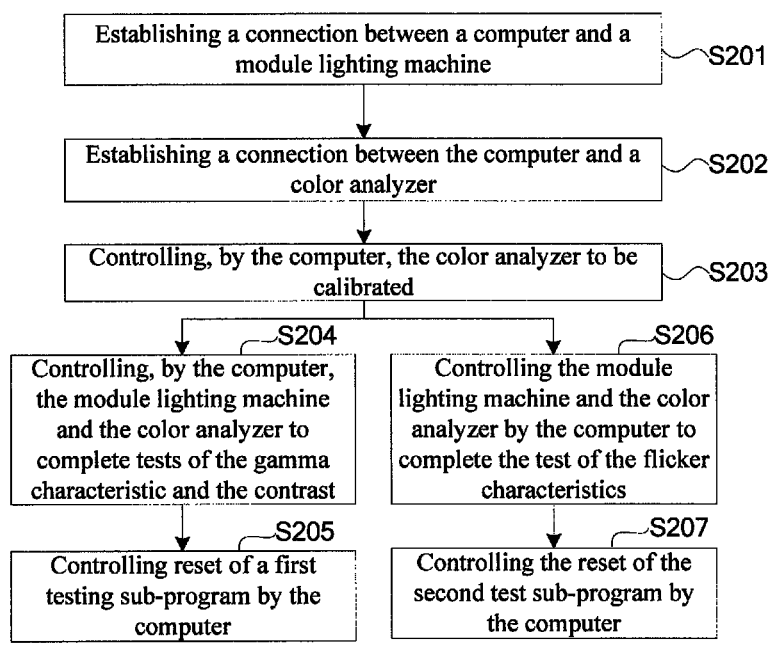
FIG. 9 is a schematic diagram of program codes for testing optical characteristics of a display module provided by an embodiment of the present invention.

For example, as illustrated in FIG. 9, a flow of program codes, which is executed by the computer, may be:

S201: Establishing a connection between a computer and a module lighting machine.

The establishing a connection between a computer and a module lighting machine may be implemented by writing a recognition sub-program of the module lighting machine in the program codes.

Exemplarily, the recognition sub-program may be implemented as:

Public defaultRM As Long
Public bGPIB As Boolean
Public errorstatus As Long

S202: Establishing a connection between the computer and a color analyzer.

The establishing a connection between the computer and a color analyzer may be implemented by writing a recognition sub-program of the color analyzer in the program codes.

Exemplarily, the recognition sub-program may be implemented as:

Public objXXX As XXX  XXX represents a device name of the color analyzer
Public objCa As Ca
Public objProbe As Probe
Public objMemory As Memory S203: Controlling, by the computer, the color analyzer to be calibrated.

After the computer is connected to the color analyzer, the computer may control the color analyzer to be calibrated so that the color analyzer is in a relatively accurate testing state, thereby ensuring that a testing result is relatively accurate. A process of controlling, by the computer, the color analyzer to be calibrated may be implemented by writing a calibration sub-program of the color analyzer in the program codes.

Exemplarily, the calibration sub-program may be implemented as:
Sub Calibration( )
Static a As Integer
If a=0 Then
Set objCa200=New Ca200
objCa200.AutoConnect
Set objCa=objCa200.SingleCa
Set objProbe=objCa.SingleProbe
Set objMemory=objCa.Memory
objCa.CalZero
Else objCa.CalZero
End If
a=a+1
objCa.SyncMode=3
objCa.AveragingMode=2
objCa.SetAnalogRange 2.5, 2.5
objCa.DisplayMode=0
objMemory.ChannelNO=1
objCa.Measure
End Sub Calibrating the color analyzer may be understood as: some parameters, a register and the like which are used in the test of the color analyzer are reset to initial states, for example, return to zero, etc.

S204: Controlling, by the computer, the module lighting machine and the color analyzer to complete tests of the gamma characteristic and the contrast.

The controlling, by the computer, the module lighting machine and the color analyzer to complete tests of the gamma characteristic and the contrast is implemented through detecting the brightness values when the to-be-tested display module displays the testing frame, and may also be implemented by writing a testing sub-program in the program codes.

Exemplarily, the testing sub-program (referred to as a first testing sub-program) may be implemented as:
Sub Measure( )
Dim n As Integer
Dim m As Integer
Dim J As Integer
Dim P As Integer
Range ("F8").Select
K=ActiveForm.Value
J=1
n=J+5
m=J+11
[L3]=[L3]+1
If [L3]<19 Then
P=[L3]
P=7+P
Else
Cells (3, 12).Value=18
P=24
End If
objCa.DisplayMode=0
objCa.Measure
Cells (P, 6).Value=objProbe.Lv whenever the module lighting machine switches one testing frame, the color analyzer detects brightness values when the to-be-tested display module displays different testing frames.
ActiveForm.Value=Cells (P, 6).Value
End Sub The brightness values, when the to-be-tested display module displays the testing frame, detected by the color analyzer may be controlled by the program computer. After the color analyzer detects the brightness values, the computer needs to read the brightness values from the color analyzer, and converts and judges the brightness values.

Exemplarily, detecting the program code of the brightness values from the color analyzer by the computer may be implemented as: "objCa.DisplayMode=0/objCa.Measure/ Cells(column, row).Value=objProbe.Lv". The brightness values may be converted into optical characteristic values by the computer by employing a related formula in the embodiment as illustrated in FIG. 3. Determining whether the optical characteristic values satisfy the preset standard or not by the computer may be implemented by a conditional statement (for example, JNB) in an assembly language.

S205: Controlling reset of a first testing sub-program by the computer.

After the computer controls the tests of the gamma characteristic and the contrast, the computer may control the reset of the first testing sub-program, that is, various variables in the first testing sub-program return to zero, so that the next control testing is facilitated and the accuracy of the next testing result is ensured. Controlling a reset process of the first testing sub-program by the computer may be implemented by writing a reset sub-program in the program codes.

Exemplarily, the reset sub-program may be implemented as:
Sub Reset( )
Cells(3, 12).Value=0
Range("F8:F24").ClearContents
Range("M3").ClearContents
Range("F30").ClearContents S206: Controlling the module lighting machine and the color analyzer by the computer to complete the test of the flicker characteristics.

The controlling the module lighting machine and the color analyzer by the computer to complete the test of the flicker characteristics may be further implemented by writing a test sub-program in the program codes.

Exemplarily, the test sub-program (referred to as a second test sub-program) may be implemented as:
Sub Flicker( )
objCa.DisplayMode=6
objCa.Measure
Cells(30, 6).Value=objProbe.FlckrFMA
End Sub The computer program may control the color analyzer to detect the flicker values when the to-be-tested display module displays the testing frame. After the color analyzer detects the flicker values, the computer needs to read the flicker values from the color analyzer, and determines the flicker values (the flicker values may represent the flicker characteristics of the display module).

Exemplarily, reading the program code of the flicker values from the color analyzer by the computer may be implemented as: "objCa.DisplayMode=6/objCa.Measure/ Cells(column, row).Value=objProbe.FlckrFMA". Determining whether the flicker values satisfy the preset standard by the computer may be implemented by a conditional statement (for example, JNB) in an assembly language.

S207: Controlling the reset of the second test sub-program by the computer.

Implementing controlling the reset of the second test sub-program by the computer is similar to implementing controlling the reset of the first test sub-program by the computer in the above S205, particularly may refer to implementing controlling the reset of the first test sub-program by the computer in the above S205, which will not be detailed herein.

In the embodiment of the present invention, for S204 and S206, a testing process controlled by the computer may be triggered manually for a testing person; or may be preset in the program codes to ensure that the computer automatically triggers the testing process controlled by the computer. After one test is completed, the computer may automatically execute the reset sub-program in S205 once to immediately reset the test sub-programs, thereby ensuring the accuracy of a next testing result.

Based on the technical solution provided by the embodiment of the present invention, the computer may enable the module lighting machine and the color analyzer to automatically execute corresponding operations according to commands of the computer through inputting the lighting command to the module lighting machine and inputting the testing command to the color analyzer, thereby ensuring that the computer can automatically control the whole testing process of the optical characteristics of the to-be-tested display module, further may relatively accurately test the optical characteristics of the display module, and can improve the testing efficiency.

Those skilled in the art will clearly appreciate that, for convenience and briefness of the description, the foregoing description is meant to be exemplary only, and in the practical application, it may be other similar implementations. Specific working processes of the above described system and device may refer to the corresponding process in the embodiment of the method, which will not be detailed herein.

In several embodiments provided by this application, it should be appreciated that, the disclosed system, apparatus and method may be implemented in other manners. For example, the above described embodiment of the device is illustrative only. On the other hand, the illustrated or discussed mutual coupling or direct coupling or communicative connection may be indirect coupling or communicative connection achieved through some interfaces, and may be of an electrical manner, a mechanical manner or other manners.

The units illustrated as separating parts may be physically separated or may be not physically separated, and parts displayed as the units may be physical units or may not be physical units, may be located in one place or may be distributed on a plurality of units. Partial or all units may be selected according to an actual demand to achieve the purpose of the solution of this embodiment.

In addition, all functional units in all embodiments of the present invention may be integrated in one processing unit, or each unit may singly physically exist, or two or more units may be integrated in one unit. The above integrated units may be implemented in a hardware manner or a software functional unit manner.

The integrated units may be stored in one computer readable storage medium when being implemented in a manner of the software functional unit and being sold or used as an independent product. Based on such understanding, the technical solution of the present invention, essentially or partial technical solution, which makes a contribution to the prior art, of the present invention or all or partial technical solution may be embodied in a software product manner, the computer software product is stored in one storage medium, and comprises a plurality of instructions, the instructions are configured to enable one computer device (may be a personal computer, a server, or a network device and the like) or a processor to execute all or partial steps of the method provided by each embodiment of the present invention. The foregoing storage medium comprises various mediums such as a U disk, a mobile hard disk, a read-only memory, a random access memory, a diskette or a compact disc capable of storing the program codes.

The foregoing description is merely exemplary implementation manners of the present invention, and is not intended to limit the protective scope of the present invention, which is defined by the appended claims.

This application claims priority of Chinese Patent Application No. 201510133241.8 filed on Mar. 25, 2015, the disclosure of which is incorporated herein by reference in its entirety as part of the present application.

What is claimed is:

1. An apparatus for testing optical characteristics of a display module, comprising:
an inputter, configured to input a lighting command to a module lighting machine, and input a testing command to a color analyzer, the lighting command being used for instructing the module lighting machine to input a preset testing frame to a to-be-tested display module, the testing command being used for instructing the color analyzer to detect parameter values when the to-be-tested display module displays the preset testing frame;
a reader, configured to read the parameter values from the color analyzer after the inputter inputs the testing command to the color analyzer; and
a determiner, configured to determine whether the optical characteristics of the display module conform to a preset standard according to the parameter values, which are detected by the color analyzer, read by the reader after testing for a preset number of times.

2. The apparatus according to claim 1, wherein,
the parameter values are brightness values when the to-be-tested display module displays the preset testing frame, and the optical characteristics are at least one of a gamma characteristic of the to-be-tested display module and a contrast of the to-be-tested display module; or
the parameter values are flicker values when the to-be-tested display module displays the preset testing frame, and the optical characteristics are flicker characteristics of the to-be-tested display module.

3. The apparatus according to claim 2, wherein the parameter values are brightness values when the to-be-tested display module displays the preset testing frame, the preset testing frame includes a plurality of gray scale frames, and the brightness values include a plurality of brightness values which are in one-to-one correspondence to the plurality of gray scale frames,
the determiner is configured to convert the plurality of brightness values, which are detected by the color analyzer and read by the reader, into a plurality of optical characteristic values of the to-be-tested display module, respectively compare the plurality of optical characteristic values of the to-be-tested display module with a preset optical characteristic range, and determine that the optical characteristics of the to-be-tested display module conform to the preset standard if a proportion that the plurality of optical characteristic values of the to-be-tested display module satisfy the preset optical characteristic range is greater than or equal to a preset proportion; and determine that the optical characteristics of the to-be-tested display module do not conform to the preset standard if the proportion that the plurality of optical characteristic values of the to-be-tested display module satisfy the preset optical characteristic range is less than the preset proportion.

4. The apparatus according to claim 2, wherein the parameter values are flicker values when the to-be-tested display module displays the preset testing frame, the determiner is configured to compare the flicker values, which are detected by the color analyzer and read by the reader, with the preset value, and determine that the optical characteristics of the to-be-tested display module conform to the preset standard if the flicker values are less than the preset value; and determine that the optical characteristics of the to-be-tested display module do not conform to the preset standard if the flicker values are greater than or equal to the preset value.

5. The apparatus according to claim 1, further comprising a writer, writer, configured to automatically write the parameter values in preset cells of a testing form after reader reads the parameter values from the color analyzer, the parameter values in the testing form being used for drawing an optical characteristic curve of the to-be-tested display module.

6. The apparatus according to claim 1, wherein the apparatus is connected and communicated with the module lighting machine through a serial interface; and the apparatus is connected and communicated with the color analyzer through a universal serial bus (USB) interface.

7. A system for testing optical characteristics of a display module, comprising a computer, as well as a module lighting machine and a color analyzer which are connected with the computer, wherein, the computer is configured to input a lighting command to the module lighting machine and input a testing command to the color analyzer, the lighting command being used for instructing the module lighting machine to input a preset testing frame to a to-be-tested display module, the testing command being used for instructing the color analyzer to detect parameter values when the to-be-tested display module displays the preset testing frame;

the module lighting machine is configured to receive the lighting command input by the computer, and input the preset testing frame to the to-be-tested display module according to the lighting command;

the color analyzer is configured to receive the testing command input by the computer, and detect the parameter values according to the testing command; and the computer is further configured to read the parameter values from the color analyzer, and determine whether the optical characteristics of the to-be-tested display module conform to a preset standard according to the read parameter values detected by the color analyzer after testing for a preset number of times.

8. The system according to claim 7, wherein, the parameter values are brightness values when the to-be-tested display module displays the preset testing frame, and the optical characteristics are at least one of a gamma characteristic of the to-be-tested display module and a contrast of the to-be-tested display module; or the parameter values are flicker values when the to-be-tested display module displays the preset testing frame, and the optical characteristics are flicker characteristics of the to-be-tested display module.

9. The system according to claim 8, wherein the parameter values are brightness values when the to-be-tested display module displays the preset testing frame, the preset testing frame includes a plurality of gray scale frames, and the brightness values include a plurality of brightness values which are in one-to-one correspondence to the plurality of gray scale frames, the computer is configured to convert the plurality of read brightness values which are detected by the color analyzer into a plurality of optical characteristic values of the to-be-tested display module, respectively compare the plurality of optical characteristic values of the to-be-tested display module with a preset optical characteristic range, and determine that the optical characteristics of the to-be-tested display module conform to the preset standard if a proportion that the plurality of optical characteristic values of the to-be-tested display module satisfy the preset optical characteristic range is greater than or equal to a preset proportion; and determine that the optical characteristics of the to-be-tested display module do not conform to the preset standard if the proportion that the plurality of optical characteristic values of the to-be-tested display module satisfy the preset optical characteristic range is less than the preset proportion.

10. The system according to claim 8, wherein the parameter values are flicker values when the to-be-tested display module displays the preset testing frame, the computer is configured to compare the read flicker values which are detected by the color analyzer with the preset value, and determine that the optical characteristics of the to-be-tested display module conform to the preset standard if the flicker values are less than the preset value; and determine that the optical characteristics of the to-be-tested display module do not conform to the preset standard if the flicker values are greater than or equal to the preset value.

11. The system according to claim 7, wherein the computer is further configured to automatically write the parameter values in preset cells of a testing form after the computer reads the parameter values from the color analyzer, the parameter values in the testing form being used for drawing an optical characteristic curve of the to-be-tested display module.

12. The system according to claim 7, wherein the computer is connected and communicated with the module lighting machine through a serial interface; and the computer is connected and communicated with the color analyzer through a universal serial bus (USB) interface.

13. A method for testing optical characteristics of a display module, comprising:

inputting a lighting command to a module lighting machine by a computer, the lighting command being used for instructing the module lighting machine to input a preset testing frame to a to-be-tested display module;

inputting the preset testing frame to the to-be-tested display module by the module lighting machine according to the lighting command;

inputting a testing command to a color analyzer by the computer, the testing command being used for instructing the color analyzer to detect parameter values when the to-be-tested display module displays the preset testing frame;

detecting the parameter values by the color analyzer according to the testing command; and reading the parameter values from the color analyzer by the computer, and determining whether optical characteristics of the to-be-tested display module conform to a preset standard according to the read parameter values detected by the color analyzer after testing for a preset number of times.

14. The method according to claim 13, wherein,
the parameter values are brightness values when the to-be-tested display module displays the preset testing frame, and the optical characteristics are at least one of a gamma characteristic of the to-be-tested display module and a contrast of the to-be-tested display module; or
the parameter values are flicker values when the to-be-tested display module displays the preset testing frame, and the optical characteristics are flicker characteristics of the to-be-tested display module.

15. The method according to claim 14, wherein the parameter values are brightness values when the to-be-tested display module displays the preset testing frame, the preset testing frame includes a plurality of gray scale frames, and the brightness values include a plurality of brightness values which are in one-to-one correspondence to the plurality of gray scale frames,
determining, by the computer, whether optical characteristics of the to-be-tested display module conform to a preset standard according to the read parameter values detected by the color analyzer, includes:
converting the plurality of read brightness values which are detected by the color analyzer into a plurality of optical characteristic values of the to-be-tested display module by the computer;
respectively comparing the plurality of optical characteristic values of the to-be-tested display module with a preset optical characteristic range by the computer;
determining that the optical characteristics of the to-be-tested display module conform to the preset standard by the computer if a proportion that the plurality of optical characteristic values of the to-be-tested display module satisfy the preset optical characteristic range is greater than or equal to a preset proportion; and
determining that the optical characteristics of the to-be-tested display module do not conform to the preset standard by the computer if the proportion that the plurality of optical characteristic values of the to-be-tested display module satisfy the preset optical characteristic range is less than the preset proportion.

16. The method according to claim 14, wherein the parameter values are flicker values when the to-be-tested display module displays the preset testing frame,
determining, by the computer, whether optical characteristics of the to-be-tested display module conform to a preset standard according to the read parameter values detected by the color analyzer, includes:
comparing the read flicker values which are detected by the color analyzer with the preset value by the computer;
determining that the optical characteristics of the to-be-tested display module conform to the preset standard by the computer if the flicker values are less than the preset value; and
determining that the optical characteristics of the to-be-tested display module do not conform to the preset standard by the computer if the flicker values are greater than or equal to the preset value.

17. The method according to claim 13, wherein after reading the parameter values from the color analyzer by the computer, the method further comprises:
automatically writing the parameter values in preset cells of a testing form by the computer, the parameter values in the testing form being used for drawing an optical characteristic curve of the to-be-tested display module.

18. The method according to claim 13, wherein,
the computer is connected and communicated with the module lighting machine through a serial interface; and
the computer is connected and communicated with the color analyzer through a universal serial bus (USB) interface.

19. A system for testing optical characteristics of a display module, comprising:
a module lighting machine;
a color analyzer;
a processor;
a memory; and
computer program instructions which are stored in the memory, and the computer program instructions, when executed by the processor, causing the system to:
input a lighting command to the module lighting machine to instruct the module lighting machine to input a preset testing frame to a to-be-tested display module;
input a testing command to the color analyzer to instruct the color analyzer to detect parameter values when the to-be-tested display module displays the preset testing frame; and
read the parameter values from the color analyzer, and determine whether optical characteristics of the to-be-tested display module conform to a preset standard according to the read parameter values detected by the color analyzer after testing for a preset number of times.

20. The system according to claim 19, wherein,
the parameter values are brightness values when the to-be-tested display module displays the preset testing frame, and the optical characteristics are at least one of a gamma characteristic of the to-be-tested display module and a contrast of the to-be-tested display module, and determining whether optical characteristics of the to-be-tested display module conform to the preset standard includes: converting the plurality of read brightness values which are detected by the color analyzer into a plurality of optical characteristic values of the to-be-tested display module; respectively comparing the plurality of optical characteristic values of the to-be-tested display module with a preset optical characteristic range; determining that the optical characteristics of the to-be-tested display module conform to the preset standard by the computer if a proportion that the plurality of optical characteristic values of the to-be-tested display module satisfy the preset optical characteristic range is greater than or equal to a preset proportion; and determining that the optical characteristics of the to-be-tested display module do not conform to the preset standard by the computer if the proportion that the plurality of optical characteristic values of the to-be-tested display module satisfy the preset optical characteristic range is less than the preset proportion, or
the parameter values are flicker values when the to-be-tested display module displays the preset testing frame, and determining whether optical characteristics of the to-be-tested display module conform to the preset standard includes: comparing the read flicker values which are detected by the color analyzer with the preset value; determining that the optical characteristics of the to-be-tested display module conform to the preset standard by the computer if the flicker values are less than the preset value; and determining that the optical characteristics of the to-be-tested display module do not conform to the preset standard by the computer if the flicker values are greater than or equal to the preset value.

\* \* \* \* \*